United States Patent [19]

Mezzancella et al.

[11] Patent Number: 4,818,040
[45] Date of Patent: Apr. 4, 1989

[54] DEBRIS STRIPPER

[76] Inventors: Edward J. Mezzancella, 74 Wedgewood Dr., Seekonk, Mass. 02771; Robert E. Kachanis, 35 Clinton St., Pawtucket, R.I. 02861

[21] Appl. No.: 147,405

[22] Filed: Jan. 25, 1988

[51] Int. Cl.$^4$ .......................... B60S 1/62; B62D 25/16
[52] U.S. Cl. ......................................... 305/12; 280/855
[58] Field of Search ....................... 305/11, 12, 13, 60; 280/158 R, 158 A; 241/166, 167

[56] References Cited

U.S. PATENT DOCUMENTS

| 983,502 | 2/1911 | Leigh | 280/158 R |
|---|---|---|---|
| 1,875,252 | 8/1932 | Meyer et al. | 280/158 R |
| 2,560,307 | 7/1951 | Slemmons | 305/38 X |
| 2,839,313 | 6/1958 | Walko | 280/158 A |
| 3,085,484 | 4/1963 | McAdams et al. | 280/158 R X |
| 4,235,479 | 11/1980 | Puglise | 305/60 X |
| 4,763,961 | 8/1988 | Parrott | 305/60 X |

FOREIGN PATENT DOCUMENTS

| 451560 | 3/1975 | U.S.S.R. | 305/12 |
|---|---|---|---|
| 263161 | 5/1927 | United Kingdom | 305/12 |

Primary Examiner—Robert B. Reeves
Assistant Examiner—Russell D. Stormer
Attorney, Agent, or Firm—Barlow & Barlow

[57] ABSTRACT

A wheeled tractor has a debris stripping plate affixed to the body and extending outwardly therefrom at each axle of the tractor to strip debris from accumulating about the inner portion of the wheel.

4 Claims, 1 Drawing Sheet

DEBRIS STRIPPER

BACKGROUND OF THE INVENTION

This invention relates to a wheeled tractor type vehicle and more particularly to a vehicle which is utilized in compacting the surface upon which it rides. To basically achieve this end, wide treadlike wheels are utilized with fairly long axles. This type of tractor as commonly known is used for compacting trash in landfill areas and in that particular application, it is operating under very adverse conditions for as the tractor is manuvered, all types of trash are picked up between the axle and the interior of the wheel. Such an accumulation of debris detrimentally effects the operation of the vehicle and causes the operator to stop frequently to clear the area between the axle and the interior of the wheel. Of general interest in the prior art relating to track-type tractors with debris cleaning are U.S. Pat. No. 2,560,307 to Slemmons and U.S. Pat. No. 3,976,337 to Vaughn.

SUMMARY OF THE INVENTION

It is an object of this invention to overcome the above-described problem by providing an economical stripper plate for breaking up any materials that are carried between the axle and the wheel of a wheeled tractor vehicle and to prevent the compacting thereof in that area such that it prevents an additional stress on the wheel of the vehicle.

Broadly stated, the invention relates to a wheeled compactor tractor having a frame and axle means for rotatably supporting wheels having wide ground engaging surfaces with teeth. The invention is an improvement which comprises a debris stripper plate which is fixed between the tractor frame, the axle and the inner portion of the wheel and which has a portion thereof which extends around the ground engaging surface of the wheel embracing at least one row of teeth thereon.

DESCRIPTION OF THE PREFERRED EMBODIMENT

Figure 1:
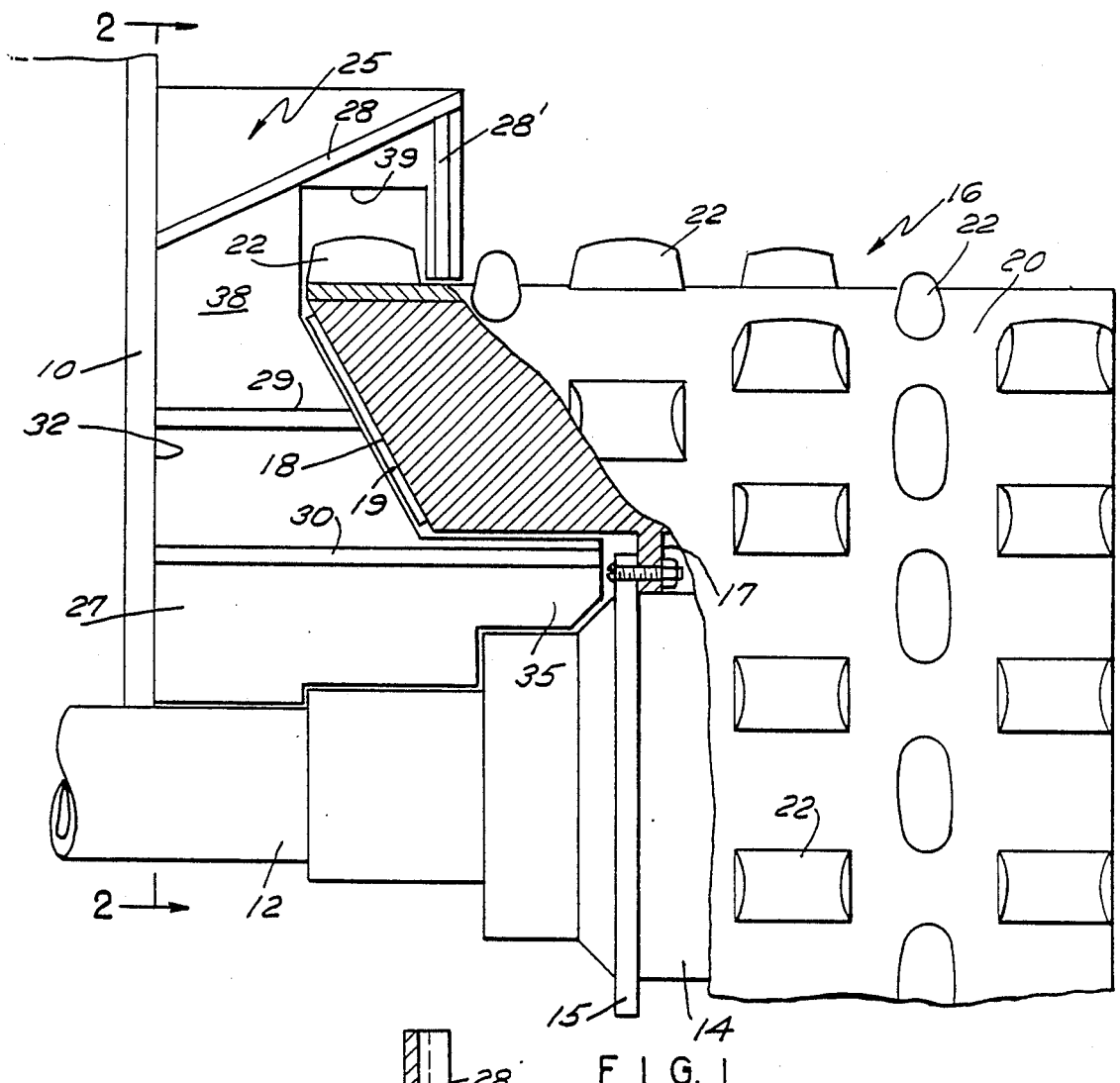
FIG. 1 is a front elevational view of a portion of the frame of the vehicle, the axle and one of the wheels.
Figure 2:
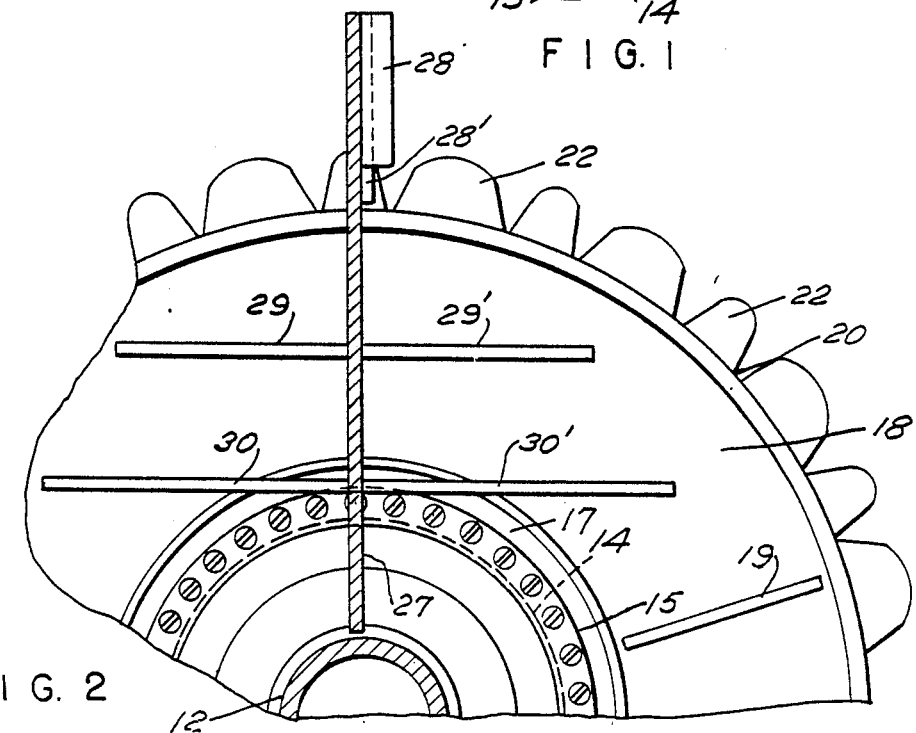
FIG. 2 is a sectional view taken on lines 2—2 of FIG. 1.

With reference to the drawings, a portion of the tractor vehicle body, including a side wall, is seen at 10 and extending from the general portion of the body is an axle and its housing 12. Fitted on the terminal portion 14 of the axle at flange 15 is a wheel generally designed 16 having a mounting ring 17. The wheel has a hub comprising an inner convex surface 18 with radial cutter bars 19 and a ground engaging surface 20 which is constituted by a plate 21. Mounted on the ground engaging surface are a plurality of teeth such as 22 that take suitable shape for the purpose desired.

The debris stripper or plate of the subject invention identified by the general reference numeral 25 reduces the amount of accumulated debris between the axle housing 12 and the interior surface 18 of the wheel 16. As will be seen in the drawings, the debris stripper plate 25 has a lower portion 27 which has a plurality of stiffening ribs 28, 28', 29, 29', 30, 30' welded thereon, the plate itself being welded as at 32 to the side plate 10 of the vehicle body. The lower portion 27 of the plate 25 extends in close proximity to the inner surface 18 of the wheel structure and has a portion thereof as at 35 that extends in over the axle housing and in close proximity to the mounting flange 15 of the axle. In addition, the stripper plate has an upper portion designated 38 which extends up and over the outer surface of the wheel with a cutout 39 to allow for the inner most ground engaging tooth to pass.

The debris stripper functions to remove debris that can be carried upwardly by the inner portion of the wheel and also will strip debris off the inner surface should any stick thereto which is very common in compacting landfill areas. The stripping or chopping function is carried out by the radial cutter 19 bars mounted on the inner convex surface of the wheel that act as a scissor conjointly with the edge of the plate.

We claim:

1. In a wheeled tractor including a frame and axle means for rotatably supporting a wheel having a ground engaging tread surface with teeth protruding radially outward and a hub supporting the tread the improvement comprising a stationary plate secured to said frame and extending outwardly therefrom in a direction substantially parallel to that of the axle and in close proximity to the inner surface of the hub of the wheel and the axle housing to define a narrow clearance therebetween for breaking-up materials that lodge between the inner surface of the hub of the wheel and about the axle.

2. In a tractor as in claim 1 wherein the plate extends above the upper portion of the tread surface of the wheel and partially thereover with embracing narrow clearance for the teeth thereon.

3. In a tractor as in claim 1 wherein the inner surface of the hub has a plurality of cutter bars mounted thereto to form a scissor with a juxtaposed edge of the plate.

4. In a tractor as in claim 1 wherein said plate has an outer edge juxtaposed and in close proximity following the contour of the inner hub surface of the wheel.

* * * * *